United States Patent Office 3,196,888
Patented July 27, 1965

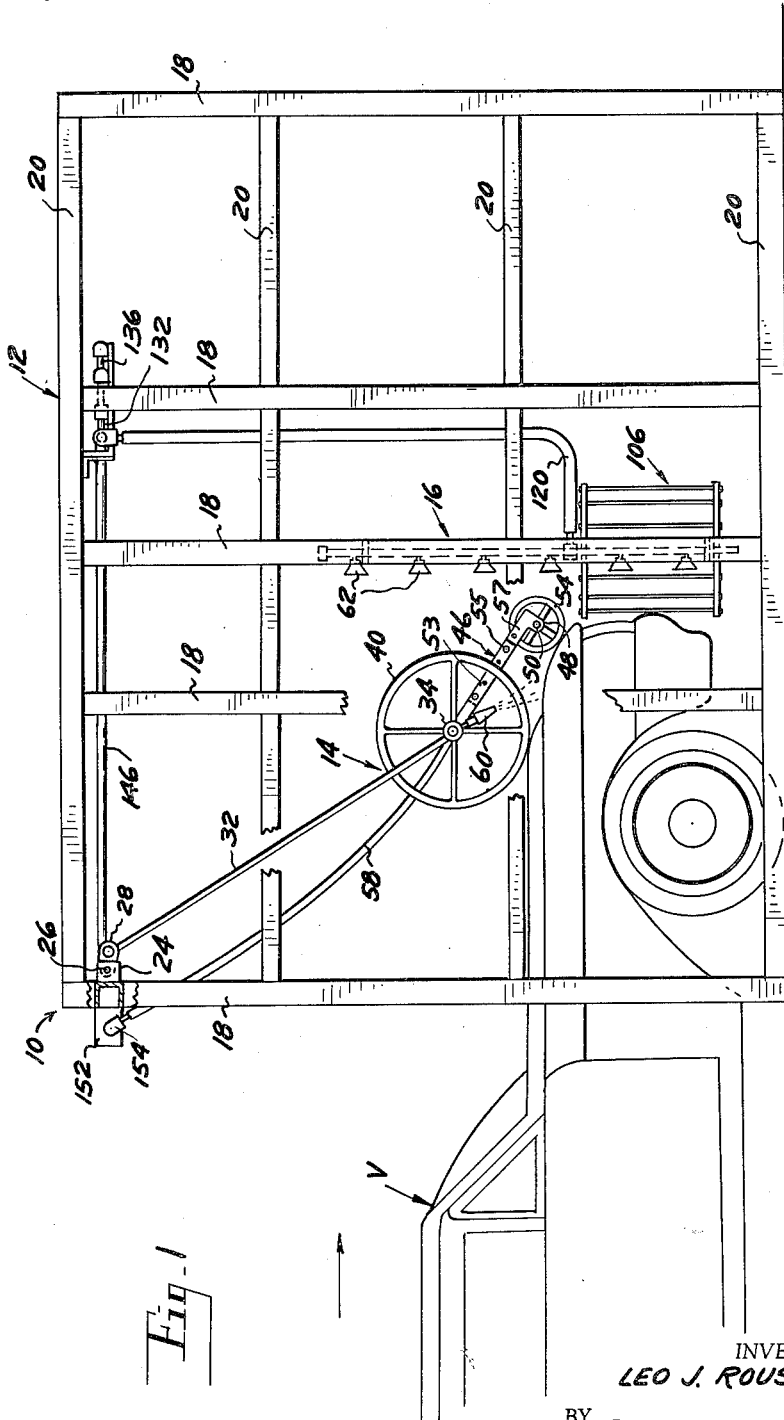

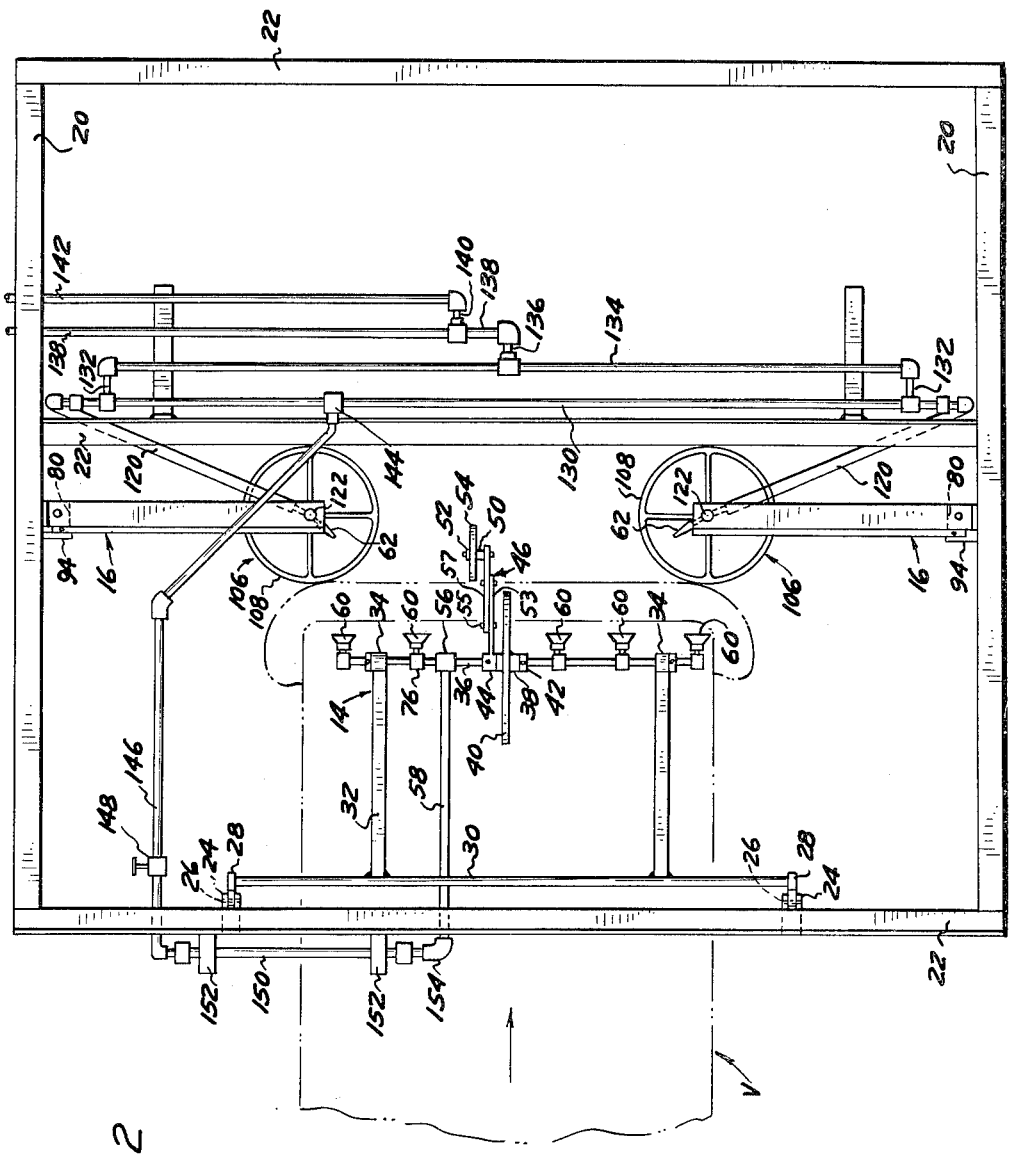

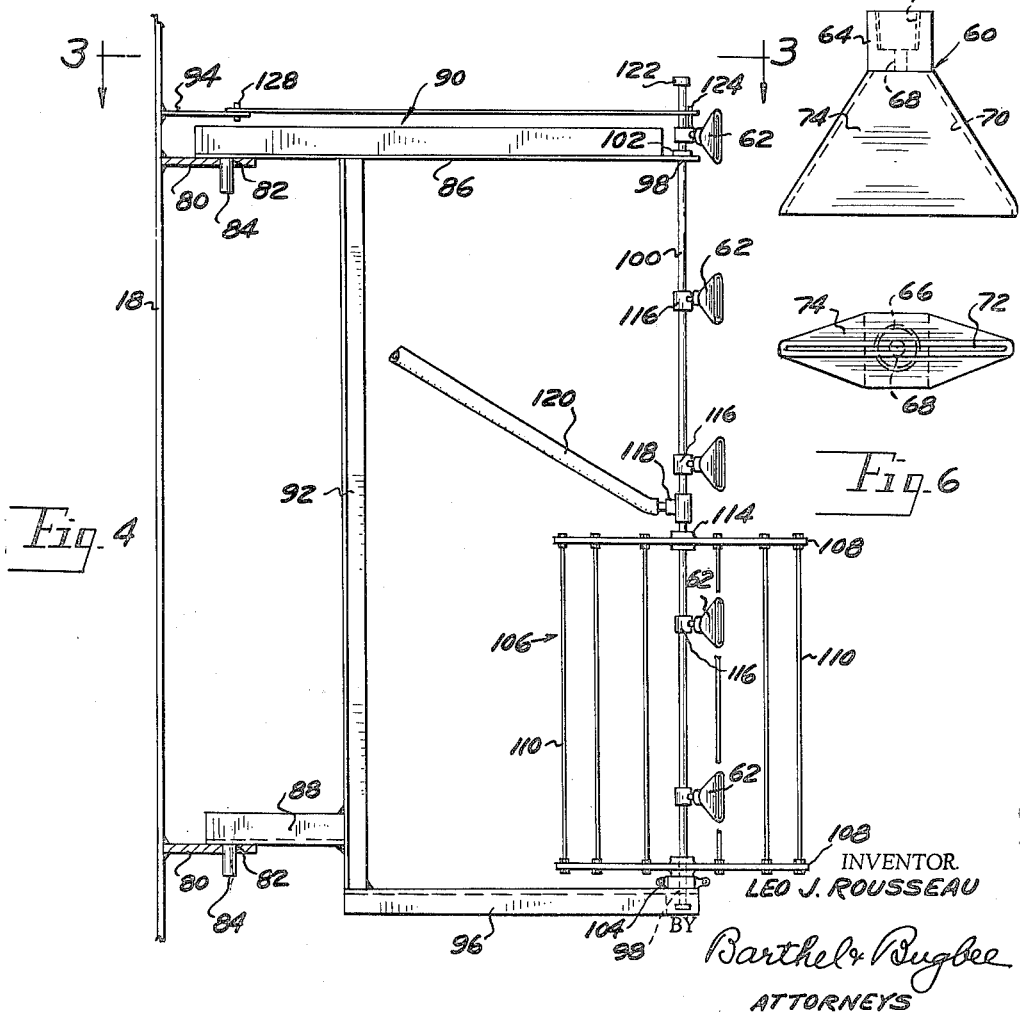

3,196,888
AUTOMATIC VEHICLE WASHING MACHINE
Leo J. Rousseau, 431 Calvin St.,
Grosse Pointe Farms, Mich.
Filed May 6, 1963, Ser. No. 278,171
5 Claims. (Cl. 134—45)

This invention relates to vehicle cleaning equipment and, in particular, to vehicle washing machines for washing vehicles.

One object of this invention is to provide an automatic vehicle washing machine which automatically removes dirt and other foreign matter from the top, front, side and rear surfaces of a vehicle body by making use of high pressure blasts or jets of a hot water and water vapor mixture which does not injure the paint or finish, and which does not require the use of brushes or other mechanical cleaning devices requiring scraping or rubbing contact with the vehicle, and consequently eliminating any possibility of accusations of scratching the paint.

Another object is to provide an automatic vehicle washing machine of the foregoing character wherein the jets or blasts of steam water mixture are produced from nozzles having long and narrow discharge openings, resulting in the production of fan-shaped streams of the cleaning fluid.

Another object is to provide an automatic vehicle washing machine of the foregoing character which requires no motors and no lubrication yet which cleans a vehicle thoroughly in a much shorter time than has been accomplished hitherto by vehicle washing machines employing brushes or the like.

Another object is to provide an automatic vehicle washing machine of the foregoing character which also cleans the white walled tires thoroughly, without the need for the additional and expensive white-wall cleaning devices hitherto required.

Another object is to provide an automatic vehicle washing machine of the foregoing character wherein means is provided for automatically directing the nozzles toward the vehicle body at the desired angle and maintaining them at that angle regardless of the varying contour of the body of the vehicle.

Another object is to provide an automatic vehicle washing machine, as set forth in the object immediately preceding, wherein means is also provided for maintaining the nozzles in close proximity to the vehicle body without actually touching it, regardless of variations in the length, width, height or configuration of the body.

The process of washing vehicles, according to the present invention, comprising subjecting the vehicle to jets of washing fluid comprising hot water at a temperature above the normal boiling point of water and at a pressure a plurality of times greater than atmosphertic pressure, is disclosed and claimed in my co-pending divisional application hereof, Serial No. 353,111 filed March 19, 1964 for Process of Washing Vehicles.

Other objects and advantages of the invention will become apparent during the course of the following description of the accompanying drawings, wherein:

FIGURE 1 is a side elevation of a vehicle washing machine according to one form of the invention, showing a vehicle entering the machine;

FIGURE 2 is a top plan view of the machine shown in FIGURE 1, with the vehicle in the same entering position;

FIGURE 3 is an enlarged top plan view, partly in section, of one of the vehicle side washing units, taken along the line 3—3 in FIGURE 4;

FIGURE 4 is a side elevation of the vehicle side washing unit shown in FIGURE 3;

FIGURE 5 is an enlarged top plan view of one of the cleaning jet nozzles; and

FIGURE 6 is a front elevation of the nozzle shown in FIGURE 5.

Referring to the drawings in detail, FIGURE 1 shows a vehicle washing machine, generally designated 10, according to one form of the invention as consisting generally of a framework 12 which arches over the vehicle V to be washed and which carries a vehicle top washing unit 14 and a pair of vehicle body side washing units 16. The term "top washing unit" as used herein refers to the entire upper surface of the vehicle including the hood, trunk and fenders, and not merely to the top surface of the cab or passenger compartment. The framework 12 is shown diagrammatically without the enclosing walls on the sides and top, and without the curtains or other spray containing or sound-deadening material which is used in commercial installations of the invention. As shown in FIGURES 1 and 2, the framework 10 includes horizontally-spaced vertical side members 18 interconnected by vertically-spaced horizontal side members 20. The uppermost horizontal members 20 are interconnected by horizontally-spaced cross members 22 (FIGURE 2).

The vehicle top washing unit 14 is pivotally mounted on laterally-spaced brackets 24 mounted on one of the cross members 22 by means of pivot pins 26 engaging ears 28 mounted on the opposite ends of a cross bar 30 (FIGURE 2). Welded or otherwise secured to the cross bar 30 in spaced parallel relationship are two arms 32, the free ends of which carry shaft bearings 34 for pivotally supporting a tubular nozzle shaft 36. Mounted for free rotation upon the nozzle shaft 36 near the approximate midportion thereof is the hub 38 of a top guide wheel 40 held in position on one side by a collar 42 bolted or otherwise secured to the shaft 36. Mounted on the shaft 36 on the opposite side of the wheel from the collar 42 is the similarly secured hub 44 of an adjustable compound angle arm, generally designated 46, which at its free end is provided with a perpendicularly-offset portion 48 carrying an axle 50 upon which is mounted the hub 52 of a nozzle directing wheel 54. The compound angle arm 46 includes a rearward portion 53 projecting forwardly from the hub 44 and is drilled with longitudinally-spaced bolt holes to receive bolts or other fasteners 55 by which it is adjustably secured to the forward portion 57 provided with the offset portion 48.

High-pressure high-velocity washing fluid, such as the steam-hot-water mixture mentioned above, is supplied to the tubular shaft 36 through a coupling 56 (FIGURE 2) to which a suitable flexible high-pressure steam hose 58 is connected. The latter leads to a source of high-pressure high-temperature hot water which turns into a hot water and steam jet spray upon emerging from the top washing nozzles 60. The top washing nozzles 60 are identical in construction and operation with side washing nozzles 62 (FIGURE 4) but are designated by different reference numerals for convenience in describing the operation of the invention.

Each washing nozzle 60 or 62 (FIGURES 5 and 6) consists of a base 64 containing an internally-threaded bore 66 and a port 68 leading into a flaring or diverging passageway 70 leading to a long narrow outlet opening 72 within the approximately triangular nozzle body 74. The base 64, which for convenience is of square cross-section, is connected to the tubular shaft 36 by means of couplings 76 onto which each nozzle base 64 is threaded and which in turn is threadedly connected to the hollow shaft 36.

The vehicle body side washing units 16 of which there are two, are mounted on the inner opposite sides in the middle of the framework 12. Since these are alike, a single description and the same reference numerals are employed for corresponding parts. Welded or otherwise securely mounted in vertically-spaced relationship upon the middle upright 18 on each side of the framework 12 are upper and lower brackets 80 (FIGURE 4) containing aligned bearing bores 82 which pivotally receive pivot pins 84 secured to and projecting downwardly from the upper and lower horizontal arms 86 and 88 of a swinging carrier frame 90. The upper and lower arms 86 and 88 are conveniently made of angle cross-section and are interconnected by a vertical member or strut 92 welded or otherwise secured thereto. Welded or otherwise secured to the upright 18 above the upper bracket 80 is a nozzle guide bracket 94 arranged parallel to the brackets 80. The upper arm 86 is longer than the lower arm 88, and to equalize the overall length, an auxiliary lower arm 96 is welded or otherwise secured to the lower end of the vertical member or strut 92, and is likewise preferably of angle cross-section. The outer ends of the arms 86 and 96 are provided with vertically-aligned bearing bores 98 in which a tubular nozzle shaft 100 is pivotally mounted and held in place by collars 102 and 104 near the upper and lower ends thereof above their respective arms 86 and 96. Rotatably mounted for free turning around the tubular shaft 100 is a guide cage or drum 106 consisting of upper and lower wheel-shaped heads 108 bored at circumferentially-spaced intervals therearound to receive interconnecting rods 110. The heads 108 have spokes 112 leading to central hubs 114 freely rotatable upon the tubular shaft 100.

Mounted at vertically-spaced intervals along the tubular shaft 100 are couplings 116 upon which are threaded the base portions 64 of the side washing nozzles 62 which, as previously stated, are identical with the top washing nozzles 60 shown in FIGURES 1, 2, 5 and 6. Also mounted on the tubular shaft 100 is a washing fluid supply coupling 118 to which is connected one end of a flexible steam hose 120 for feeding the high pressure hot water and steam mixture to the nozzle 62. The opposite ends of the tubular shaft 100 are closed by end caps 122. Mounted on the uppermost nozzle 62 at a location spaced away from the axis of the tubular shaft 100 is a crank pin 124 (FIGURES 3 and 4) which pivotally engages the outer end of a link 126, the inner end of which pivotally engages a pivot pin 128 mounted on and projecting upwardly from the nozzle guide bracket 94. The pivot pin 128, like the pivot pin 124, is spaced away from the axis of the pivot pins 84 by the same distance as the distance of the pivot pin 124 from the axis of the tubular shaft 100 (FIGURE 3), and on parallel radii. As a result, upon swinging of the nozzle carrier frame 90, the guide link 126 causes the nozzle shaft 100 to rotate in a direction opposite that of the direction of swinging, thereby directing the nozzles 62 at the proper angle to the vehicle body regardless of the width of the vehicle causing the swinging of the frames 90.

The flexible hoses 120 of the two vehicle body side washing units 16 are connected at their upper ends to the opposite ends of a pipe 130, near which connections 132 lead to a cross pipe 134 from the approximate midpoint of which a connection 136 leads to a main supply pipe 138 from which a connection 140 leads to an auxiliary supply pipe 142. From a coupling 144 on the pipe 130, a branch supply line 146 leads through a shutoff valve 148 to a short cross pipe 150 supported in brackets 152 from the adjacent cross member 22. Mounted at the inner end of the pipe 150 is a coupling 154 to which is connected the upper end of the hose 58. Enough slack is provided in the hose 58 for free rise and fall of the top washing unit 14.

The main and auxiliary supply pipes 138 and 142 are connected, through suitable shutoff valves (not shown), to a conventional high pressure hot water heater of which examples are available on the open market. One such hot water heater which has been found satisfactory is the so-called "Clayton" steam cleaner made in El Monte, California. Two such heaters have been employed, each a duplicate of the other, and each delivering 800 gallons per hour of hot water at a temperature of 340° F. Also associated with the heaters is a cleaning compound supply tank in which a conventional cleaning compound is mixed with the hot water before delivery to the supply pipes 138 and 142. From experience with the actual vehicle washing machine constructed according to the present invention, it has been found that a machine can satisfactorily wash one passenger automobile every half minute, using approximately 14 gallons of water per car at a pressure of approximately 150 pounds per square inch.

Located adjacent and between the side washing units 16 is a conventional vehicle wheel spinner unit (not shown), the purpose of which is to spin the wheels of the vehicle while they are subjected to the blasts of cleaning fluid from the nozzles 62 as the vehicle V is drawn through the machine 10 by the usual conveyor (not shown) or other suitable means. Such wheel spinners and conveyors are conventional and have long been in use in vehicle washing machines, and they are omitted from the drawings in order to avoid complicating the disclosure by a showing of such conventional mechanisms. It will suffice to say that the wheel spinner consists of a pair of drums spaced apart from one another on a transverse shaft, the width of the usual automobile "tread," namely the separation of the central planes of the tires of the wheels. Idler rollers are provided in front of and behind each of the drums to support the wheels while they are rotated by the drums. The drum shaft is driven at one end by a conventional electric motor through reduction gearing.

In the operation of the invention, let it be assumed that a vehicle V, such as a passenger automobile, has entered the forward end of the machine as shown in FIGURE 1. As the vehicle V is drawn through the machine, the nozzle-directing wheel 54 first engages the front bumper and then rides up over the grill onto the top of the hood as blasts of hot water vapor emerge from the nozzles 60 onto the body at an angle of approximately seven to ten degrees to the surface. This angle is adjustable by adjusting the angle of the compound arm 46 to the nozzles 60. The hot water at high pressure emerging from the nozzles 60 (and 62) immediately becomes a mixture of hot water and steam. It emerges from the nozzles at a temperature of about 212° F. and has a temperature of about 187° F. at the instant it hits the vehicle body surface. This mixture of steam and hot water by hitting the car body surface at an acute angle and at high pressure washes off the dirt and other foreign matter and the cleaning compound which it contains exerts a detergent action which loosens or dissolves oil, grease or the like. Thus, while the water in the boiler is at the comparatively high temperature of 340° F., it is not hot enough to scald the hands at the time it hits the car body, and the hands can be passed through the fluid blast from the nozzle 60 without injury. Because of the long and thin opening 72 of each nozzle 60, the blast of fluid from each nozzle emerges in a fan-shaped jet, the nozzles 60 being spaced apart from one another a distance which will cause these fan-shaped jet blasts to overlap one another. As the guide wheel 40 rolls over the upper surface of the vehicle V, it spaces the nozzles 60 at the most suitable distances from the vehicle body surface while at the same time the nozzle directing wheel 54 aims the nozzle 60 at the desired angle to the surface being cleaned. This continues to occur as the guide wheel 40 and nozzle-directing wheel 54 ride up over the windshield and top of the passenger compartment and down over the trunk compartment and rear thereof.

Meanwhile, the front of the vehicle V has passed between the guide drums 106 of the side washing units 16, swinging the nozzle carrier frames 90 rearwardly as the vehicle bumper engages the guide drums 106. At the same time, high pressure blasts of hot water and steam are directed at the sides of the vehicle through the side nozzles 62 with an action similar to that described above for the top nozzles 60, the fan-shaped jets of fluid overlapping one another and encountering the body surfaces at an acute angle which sweeps off the dirt and other foreign matter. The high pressure hot water containing the cleaning composed is supplied through the hoses 120, which permit swinging of the nozzle carrier frames 90 to adapt the machine 10 to any width of vehicle. The open construction of the guide drum 106, because of the small diameters of the rods 110, offers negligible interference to the blasts of washing fluid emerging from the nozzles 62 within them.

In the meantime, as the nozzle carrier frames 90 are thus swung as indicated in FIGURE 3, the link 126 anchored to the pivot pin 128 on the bracket 94 continues to point the nozzles 26 at the desired constant acute angle to the sides of the vehicle body with an action similar to that described above for the top washing unit 14. All portions of the sides of the vehicle are thus subjected to the washing action as the vehicle passes through the machine 10 in a manner similar to that described above for the operation of the top washing unit 14 and hence requires no repetition. The guide drums 106, being approximately 16 inches in diameter, maintain a separation of the hollow shaft 100 of about 8 inches from the vehicle body. Following passage through the washing machine 10, the vehicle V is drawn through a drying machine from which streams of air sweep off the drops of liquid from the body surfaces and dry the vehicle. Such drying machines are conventional and one very successful one which has been long used is disclosed and claimed in my previous Patent No. 2,448,834 issued Sept. 7, 1948 for Motor Vehicle Drying Apparatus.

What I claim is:
1. An automatic vehicle washing machine comprising a supporting framework having laterally-spaced side portions providing a vehicle pathway therebetween, a pair of side-washing nozzle supports movably mounted on said side portions on opposite sides of said pathway for motion toward and away from said pathway, multiple side-washing nozzles mounted on said side-washing nozzle supports and directed laterally toward said pathway in vertically-spaced relationship, a top-washing nozzle support movably mounted on said framework above said pathway for up-and-down motion toward and away from said pathway, multiple top-washing nozzles mounted on said top-washing nozzle support in downwardly-directed laterally-spaced relationship, and means for supplying pressurized hot water to said nozzles, said side-washing nozzle supports being pivotally mounted on said side portions on vertical pivot axes, each of said side-washing nozzle supports including a nozzle carrier movably mounted thereon for pivoting relatively thereto, said side-washing nozzles being mounted on said carriers, and means for rotating said nozzle carriers relatively to said nozzle supports for directing said nozzles at approximately constant angles of aim relatively to said pathway.

2. An automatic vehicle washing machine, according to claim 1, wherein said means includes a link member pivotally anchored at one end to said framework and pivotally connected to said nozzle carrier at a location spaced away from the pivot axis of said nozzle carrier.

3. An automatic vehicle washing machine comprising a supporting framework having laterally-spaced side portions providing a vehicle pathway therebetween, a pair of side-washing nozzle supports movably mounted on said side portions on opposite sides of said pathway for motion toward and away from said pathway, multiple side-washing nozzles mounted on said side-washing nozzle supports and directed laterally toward said pathway in vertically-spaced relationship, a top-washing nozzle support movably mounted on said framework above said pathway for up-and-down motion toward and away from said pathway, multiple top-washing nozzles mounted on said top-washing nozzle support in downwardly-directed laterally-spaced relationship, and means for supplying pressurized hot water to said nozzles, said top-washing nozzle support including a top-washing nozzle carrier pivotally mounted thereon for rotary motion relatively thereto, said top-washing nozzle being mounted on said top-washing nozzle carrier, and means for rotating said top-washing nozzle carrier relatively to said top-washing nozzle support for directing said top-washing nozzles at approximately constant angles relatively to the vehicle top passing thereunder.

4. An automatic vehicle washing machine, according to claim 3, wherein said means includes an arm member guidingly connected to said top-washing nozzle carrier and wherein a nozzle-directing top-contacting member is mounted on said arm.

5. An automatic vehicle washing machine, according to claim 4, wherein said nozzle-directing member includes a nozzle-directing wheel rotatably mounted on said arm.

References Cited by the Examiner
UNITED STATES PATENTS

| | | | |
|---|---|---|---|
| 872,314 | 11/07 | Wilson | 134—34 |
| 1,682,902 | 9/28 | Gibson | 134—45 |
| 1,907,411 | 5/33 | Timoney | 134—123 X |
| 2,732,846 | 1/56 | Berezny | 134—45 |
| 2,751,915 | 6/56 | Roberts | 134—123 |
| 2,768,101 | 10/56 | Fairchild | 134—34 |
| 3,085,351 | 4/63 | Hurst | 134—45 X |

FOREIGN PATENTS 437,672  11/26  Germany.

CHARLES A. WILLMUTH, *Primary Examiner.*

G. J. NORTH, *Examiner.*